United States Patent
Klemm

(10) Patent No.: US 9,094,354 B2
(45) Date of Patent: Jul. 28, 2015

(54) FACILITATING REAL-TIME COMMUNICATIONS IN ELECTRONIC MESSAGE BOARDS

(75) Inventor: Reinhard Peter Klemm, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 663 days.

(21) Appl. No.: 12/570,801

(22) Filed: Sep. 30, 2009

(65) Prior Publication Data

US 2011/0078588 A1 Mar. 31, 2011

(51) Int. Cl.
*G06F 3/0481* (2013.01)
*H04L 12/58* (2006.01)
*G06F 17/30* (2006.01)
*G06Q 10/10* (2012.01)
*H04L 12/18* (2006.01)

(52) U.S. Cl.
CPC .......... *H04L 51/18* (2013.01); *G06F 17/30882* (2013.01); *G06Q 10/10* (2013.01); *H04L 12/1818* (2013.01); *H04L 51/32* (2013.01)

(58) Field of Classification Search
CPC ............... G06F 3/0481; G06F 3/0482; G06F 17/30882; G06Q 10/10
USPC .......... 715/753, 758, 749, 760, 748, 754, 752
See application file for complete search history.

(56) References Cited

U.S. PATENT DOCUMENTS

| | | | | |
|---|---|---|---|---|
| 6,052,709 A * | 4/2000 | Paul | ............................... | 709/202 |
| 7,039,040 B1 * | 5/2006 | Burg | ............................... | 370/352 |
| 7,657,598 B2 * | 2/2010 | Daniell et al. | ................ | 709/206 |
| 7,768,998 B1 * | 8/2010 | Everson et al. | ............... | 370/352 |
| 8,316,095 B1 * | 11/2012 | Wheeler et al. | ............... | 709/206 |
| 8,700,704 B2 * | 4/2014 | Arav | ............................. | 709/204 |
| 2001/0018704 A1 * | 8/2001 | Kikugawa | ...................... | 709/206 |
| 2003/0041110 A1 * | 2/2003 | Wenocur et al. | .............. | 709/206 |
| 2003/0221167 A1 * | 11/2003 | Goldstein et al. | ............. | 715/513 |
| 2004/0054428 A1 * | 3/2004 | Sheha et al. | .................... | 700/56 |
| 2005/0030937 A1 * | 2/2005 | Wick et al. | ..................... | 370/352 |
| 2007/0006094 A1 * | 1/2007 | Canfield et al. | ................ | 715/781 |
| 2007/0064900 A1 * | 3/2007 | Kowalewski et al. | ..... | 379/202.01 |
| 2008/0005355 A1 * | 1/2008 | Craft et al. | ..................... | 709/245 |
| 2008/0016453 A1 * | 1/2008 | Quillen et al. | .................. | 715/763 |
| 2008/0168040 A1 * | 7/2008 | Jones et al. | ........................ | 707/3 |
| 2009/0013074 A1 * | 1/2009 | Rice | ............................... | 709/224 |
| 2009/0042654 A1 * | 2/2009 | Barber | ............................ | 463/42 |
| 2009/0112683 A1 * | 4/2009 | Hamilton et al. | ............... | 705/10 |
| 2009/0157834 A1 * | 6/2009 | Krishnaswamy | ............. | 709/206 |
| 2009/0164309 A1 * | 6/2009 | Mgrdechian et al. | ........... | 705/10 |
| 2009/0192928 A1 * | 7/2009 | Abifaker | ......................... | 705/35 |
| 2010/0030648 A1 * | 2/2010 | Manolescu et al. | ......... | 705/14.66 |
| 2010/0042690 A1 * | 2/2010 | Wall | ............................... | 709/206 |
| 2010/0146343 A1 * | 6/2010 | Shimada et al. | ................ | 714/48 |
| 2010/0205539 A1 * | 8/2010 | Gestsson et al. | .............. | 715/752 |

* cited by examiner

*Primary Examiner* — Steven Sax

(57) ABSTRACT

A method is provided in which a message board server receives a message that is posted by a first user and transmits a link to another user of the message board. When the link is activated, a communications session is established between the user who activated the link and a telecommunications session recipient.

17 Claims, 9 Drawing Sheets

FACILITATING REAL-TIME COMMUNICATIONS IN ELECTRONIC MESSAGE BOARDS

FIELD OF THE INVENTION

The present invention relates to telecommunications in general, and, more particularly, to providing real-time communications capability to message boards including blogs and microblogs.

BACKGROUND OF THE INVENTION

Businesses want their customers to communicate with each other. Communications between customers foster a sense of community and increase brand loyalty. Online message boards are perhaps the most common venue at which business customers meet. Customers use these message boards to discuss their purchases and obtain advice.

A great advantage of message boards is that they allow users to communicate with each other. A textual conversation on a message board, however, is generally not conducive to an in-depth exploration of a topic and does not lend itself to efficient collaborations. Such forms of user interactions are better served by real-time communications such as telephony or video calls. Moreover, because of the nature of message boards, a user ("poster") who posts a question to another user or a set of users is not certain to obtain a response. Generally, on electronic message boards, there is no guarantee that the person(s) to whom the question is directed will ever return to read their messages. And even if there is a response to the posted question, there is no guarantee of a time frame in which this will happen. Therefore, from the standpoint of a user who needs to obtain information efficiently, it is better to call the other message board user(s) directly, rather than trying to communicate with them via the message board.

However, this is not easily possible because electronic message boards do not provide real-time communications capabilities to their members. It is possible for a user to post his or her phone number or other real-time communications endpoint identifier on the message board to invite others to initiate a real-time communications sessions but this method has several drawbacks:

One drawback is that the communications initiator may have to bear the cost of the ensuing real-time communications session, as opposed to the provider of the message board in whose interest it may be to allow users to communicate with each other.

Another drawback is that a significant amount of time may have passed between posting of the phone number or other endpoint identifier and the time when somebody ("responder") decides to call the number. Often, the party who posted his or her number and the responder are not known to each other. Thus, when the party receives an incoming call from the responder, the incoming call is likely to resemble an unexpected incoming call from an unknown person and there is a good chance that the called party will reject the call.

A third drawback is that when the contact information of a person is posted on the Internet, the person has no control over who calls and when. Moreover, the person instantly becomes target for unsolicited calls and spam. This problem causes most message board users to choose not to make their contact information available to other message board users.

And a fourth drawback is that typically, there is no strong incentive for somebody to respond to the poster, especially in real-time. Therefore, any complication in setting up real-time communications with the poster can act as a deterrent that might make a potential responder to decide against initiating a communications session. Examples of such complications are having to look for a phone number in a post, key it into a phone (with the potential for errors and thus repeats), starting up a video communications client, having to log into it, etc.

For these reasons, the need exists for a method that allows the convenient establishment of real-time communications between message board users without making their contact information publicly available.

SUMMARY OF THE INVENTION

The present invention addresses this need by providing a method for the establishment of real-time communications between the users of a message board. The present invention is for a method in which a message board server generates a link (e.g. button, hyperlink, icon, etc.) for a message which is posted on the message board. Subsequently, the message board transmits the link to a message board user who wishes to view to message. The user activates the link and starts a telecommunications session with a telecommunications session recipient. The link does not disclose the telecommunications network address (e.g. endpoint identifier) of the telecommunications session recipient.

For the purposes of this specification, a "telecommunications session recipient" is defined as:
 (i) a person, or
 (ii) an entity, or
 (iii) a telecommunications terminal, or
 (iv) any combination of i, ii, and iii
with whom a telecommunications session is established upon the activation of a link. For example, and without limitation, the present invention can be applied in a situation in which a first user posts a message on a message board. The user transmits the message to a message board server which processes and stores the message. When a second user connects to the message board, the message board server transmits to the second user the message which was posted by the first user. In addition to transmitting the message, the message board server transmits a button to the second user. The button is displayed on the second user's computer. When the second user presses the button, a telephone or video or IM chat or other real-time call is established between the second user and a telecommunications session recipient.

In a first embodiment of the present invention, when the link is activated by a user, the message board server establishes a first telecommunications session between the message board server and the user. The message board server also establishes a second telecommunications session between the message board server and a telecommunications session recipient. After the two telecommunications sessions are established, they are bridged together. The bridging enables the user to directly communicate with the telecommunications session recipient.

In a second embodiment of the present invention, before bridging the two telecommunications sessions, the message board server plays a message to the telecommunications session recipient. The message can provide a clue about the nature of the telecommunications session, such as a reference to the post and the message board, for example. Specifically, the reference may incorporate a copy of the post and a description of the message board in which the post appeared. Additionally, the message can provide the telecommunications session recipient with an opportunity to decline to participate in the telecommunications session before he or she has interacted with a live person, reschedule the call, or redirect the call to a different communications system.

In a third embodiment of the present invention, the telecommunications session recipient is selected by the message board server on the basis of a characteristic. For the purposes of this specification a "characteristic" of a telecommunications session recipient is defined as an item of information about the recipient. For example, and without limitation, the selection can be made on the basis of the language spoken by the telecommunications session recipient, profession, and others. Further examples of characteristics of a telecommunications session recipient are found in the "Detailed Description" section of this disclosure.

In a fourth embodiment of the present invention, a rule for the selection of telecommunications session recipient is specified by a third party and transmitted to the message board server. The message board server receives the rule and implements it. For example, and without limitation, a business may create a rule which requests that its customer service department be listed as a telecommunications session recipient for all messages which mention the business's products.

In a fifth embodiment of the present invention, the link, which is generated for a message that is posted on the message board, is specific to the content of the message. For example, if a message contains the keyword "Nvidia," the present invention will select a telecommunications recipient that is knowledgeable with respect to Nvidia™ products. The mapping between keywords and telecommunications session recipients is specified by rules for the selection of telecommunications session recipients.

The present invention has at least three advantages over the prior art. First, the contact information of the telecommunications session recipient need not be made available to the user. Since the message board server sets up the telecommunications session between the user and the telecommunications session recipient, there is no need for the user to have access to the contact information (e.g. telephone number) of the telecommunications session recipient.

Second, the message board server allows businesses to foot the bill for the telephone calls that are made between message board users. Because the message board server establishes telecommunications sessions by initiating two separate sessions and subsequently bridging them, the participants in the bridged telecommunications session need not pay for the initiation of either of the telecommunications sessions which are established by the server.

Third, the present invention allows businesses to filter the messages that are posted on product message boards and connect customers to telecommunications session recipients of whom the businesses approve (e.g. customer service departments, people who have nice things to say about the business's products, etc.).

The following disclosure teaches examples of some embodiments of the present invention.

DETAILED DESCRIPTION

Figure 1:
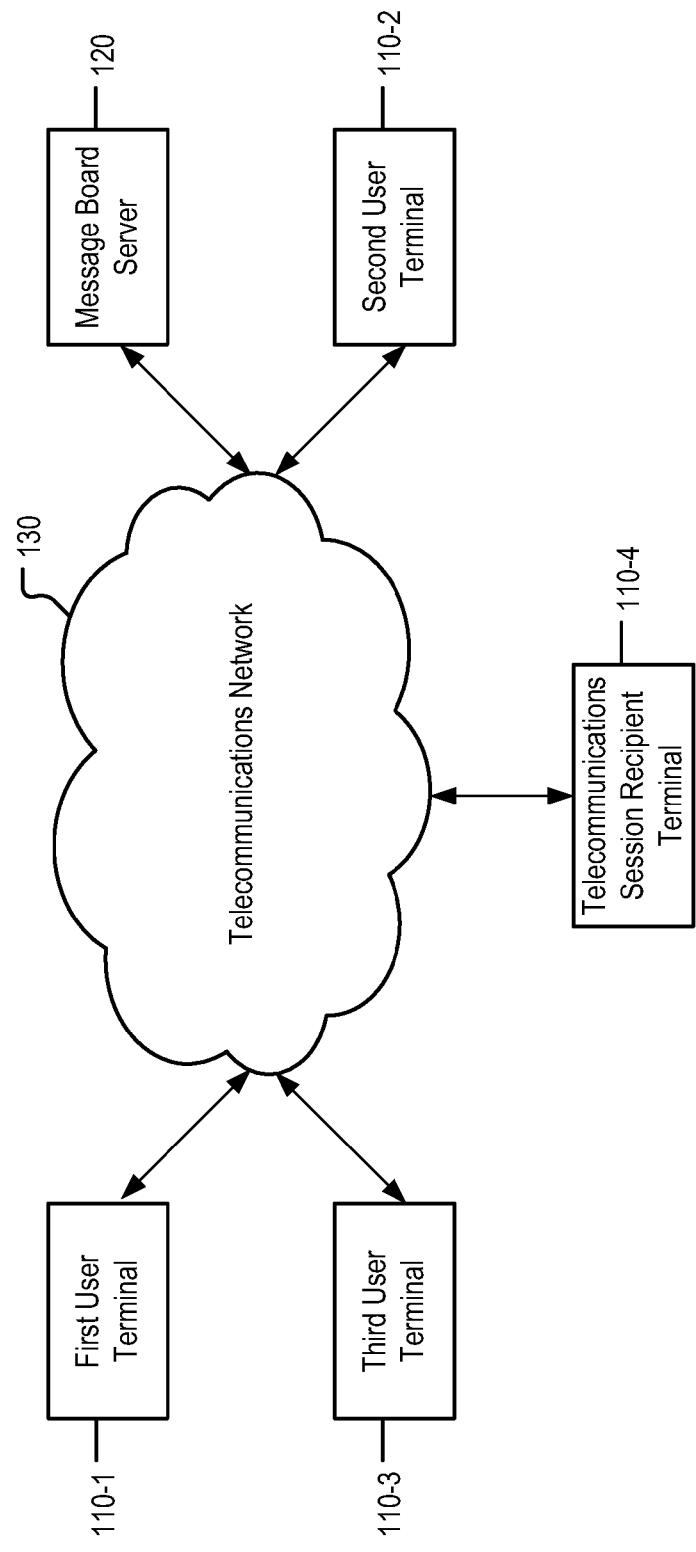
FIG. 1 depicts a schematic diagram of the salient components of the illustrative embodiment of the present invention.

FIG. 1 depicts a schematic diagram of the salient components of the illustrative embodiment of the present invention. The illustrative embodiment of the present invention comprises terminal 110-$i$, wherein i∈{1, 2, 3, 4}, message board server 120, and network 130.

Terminal 110-$i$ is a personal computer capable of communicating with terminal 110-$i$ and message board server 120. Terminal 110-$i$ is capable of sending and receiving data over network 130, as well as conducting telephone calls by using soft phone software. It will be clear to those skilled in the art, after reading this disclosure, how to make and use alternative embodiments of the present invention in which terminal 110-$i$ is another type of telecommunications device (e.g. cellular telephone, landline telephone receiver, 2-way radio, portable digital assistant etc.).

Message board server 120 is an electronic message board server. It is computer hardware (e.g. processor, memory, etc.) that executes message board software. The message board software allows users to perform functions such as uploading and downloading data, posting and reading messages, etc. In particular, the message board software maintains a database which stores all messages that have been uploaded by the message board users. Users of the message board can retrieve messages from the database and view them on their terminals. In accordance with illustrative embodiment of the present invention, the messages managed by server 130 are text messages, but it will be clear to those skilled in the art, after reading this disclosure, how to make and use alternative embodiments of the present invention in which the messages are of another media type, such as, for example, and without limitation, pictures, sound clips (e.g. voice messages), video files, etc.

In addition to storing messages, message board server 120 is responsible for enabling its users to connect with each other in real-time. In particular, message board server 120 allows the reader of a post on the message board to conduct a real time telecommunications session with a telecommunications session recipient. The telecommunications recipient is selected by message board server 120 and it can be another user of the message board or a third party. The manner in which the telecommunications session recipient is selected is further described in the remaining discussion.

Network 130 transports signals between message board server 120 and terminal 110-$i$. In accordance with the illustrative embodiment of the present invention, telecommunications network 130 is the Internet, but it will be clear to those skilled in the art, after reading this disclosure, how to make and use alternative embodiments of the present invention in which network 130 is any type of telecommunications network (e.g. local area network, the Public Switched Telephone Network, SONET, ATM, cellular network, etc.).

Figure 2:
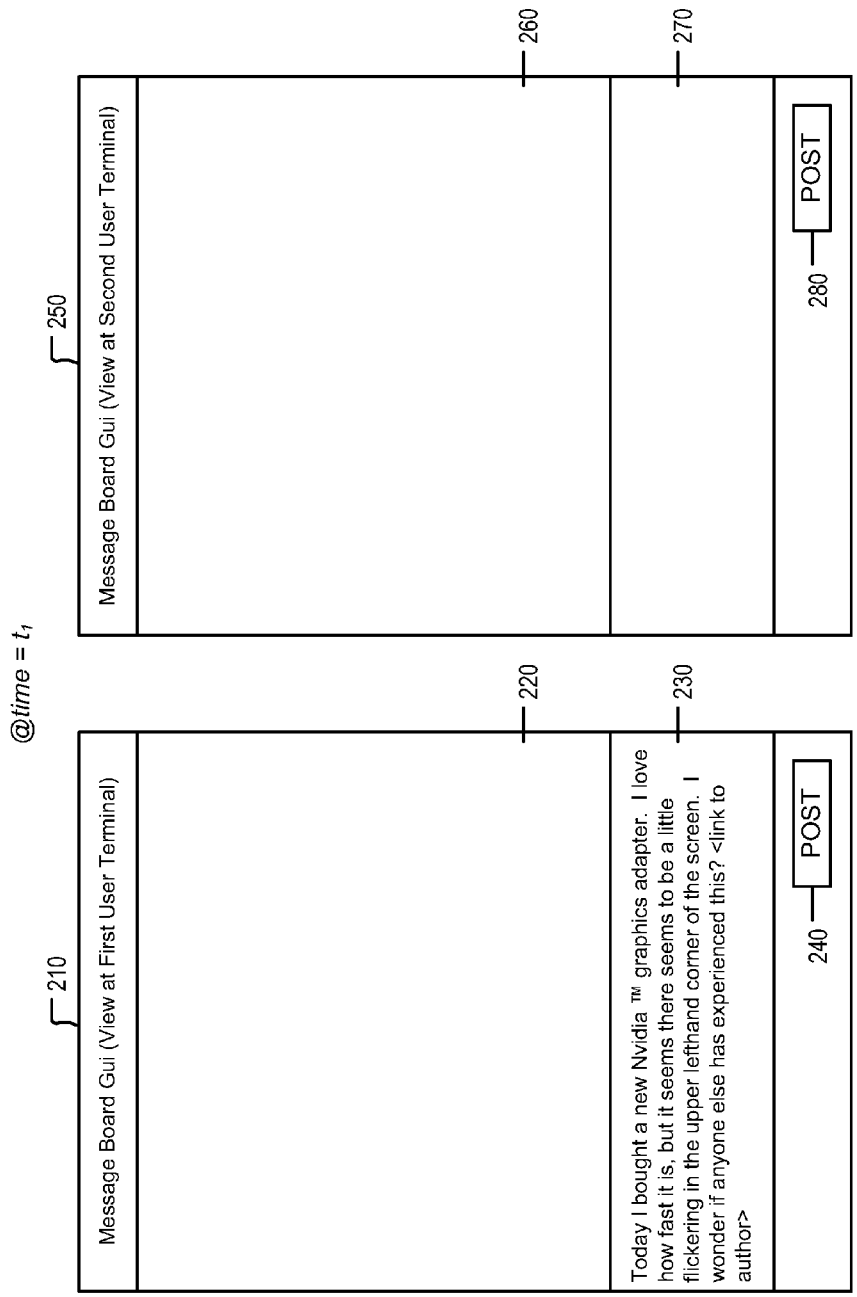
FIG. 2 depicts a schematic diagram of the salient components of the illustrative embodiment of the present invention at time $t_1$.

FIG. 2 depicts a schematic diagram of the salient components of the illustrative embodiment of the present invention at time $t_1$. At time $t_1$, a message is entered into interface 210, but the message is not yet posted on message board server 120. The illustrative embodiment of the present invention comprises interface 210, field 220, field 230, button 240, interface 250, field 260, field 270, and button 280.

Interface 210 is a graphical user interface (GUI) for the message board of message board server 120. Interface 210 is executing on terminal 110-1. In accordance with the illustrative embodiment of the present invention, interface 210 is a hypertext markup language (HTML) form which executes inside a web browser, but it will be clear to those skilled in the art, after reading this disclosure, how to make and use alternative embodiments of the present invention in which interface 210 is freestanding. Furthermore, it will be clear to those skilled in the art, after reading this disclosure, how to make and use alternative embodiments of the present invention in which another programming language is used to implement interface 210 (e.g. Java, C++, etc.). Interface 210 comprises field 220, field 230, and button 240.

Field 220 is a graphical user interface (GUI) textbox component that is capable of displaying text. Field 220 is used to display messages that are posted on the message board. In accordance with the illustrative embodiment of the present invention, field 220 is capable of displaying text only, but it will be clear to those skilled in the art, after reading this disclosure, how to make and use alternative embodiments of the present invention in which field 220 is a graphical user interface (GUI) component for displaying any type of media (e.g. pictures, video clips, sound clips, etc.).

Field 230 is graphical user interface (GUI) text input component. In accordance with the illustrative embodiment of the present invention, field 230 is capable of accepting text input only, but it will be clear to those skilled in the art, after reading this disclosure, how to make and use alternative embodiments of the present invention in which field 230 is a graphical user interface (GUI) component that is capable of accepting any type of media input (e.g. pictures, sound, video, etc.). In accordance with the illustrative embodiment of the present invention, filed 230 has a message entered into it by the user of terminal 110-1.

Button 240 is a graphical user interface (GUI) button component which, when pressed, causes the content of field 230 to be transmitted to message board server 120.

Interface 250 is a graphical user interface (GUI) for the message board of message board server 120. Interface 250 is executing on terminal 110-3. In accordance with the illustrative embodiment of the present invention, interface 250 is a hypertext markup language (HTML) form which executes inside a web browser, but it will be clear to those skilled in the art, after reading this disclosure, how to make and use alternative embodiments of the present invention in which interface 250 is freestanding. Furthermore, it will be clear to those skilled in the art, after reading this disclosure, how to make and use alternative embodiments of the present invention in which another programming language is used to implement interface 250 (e.g. Java, C++, etc.). Interface 250 comprises field 260, field 270, and button 280.

Field 260 is a graphical user interface (GUI) textbox component that is capable of displaying text. Field 260 is used to display messages that are posted on the message board. In accordance with the illustrative embodiment of the present invention, field 260 is capable of displaying text only, but it will be clear to those skilled in the art, after reading this disclosure, how to make and use alternative embodiments of the present invention in which field 260 is a graphical user interface (GUI) component for displaying any type of media (e.g. pictures, video clips, sound clips, etc.).

Field 270 is graphical user interface (GUI) text input component. In accordance with the illustrative embodiment of the present invention, field 270 is capable of accepting text input only, but it will be clear to those skilled in the art, after reading this disclosure, how to make and use alternative embodiments of the present invention in which field 270 is a graphical user interface (GUI) component that is capable of accepting any type of media input (e.g. pictures, sound, video, etc.).

Button 280 is a graphical user interface (GUI) button component, which, when pressed, causes the content of field 270 to be transmitted to message board server 120.

Figure 3:
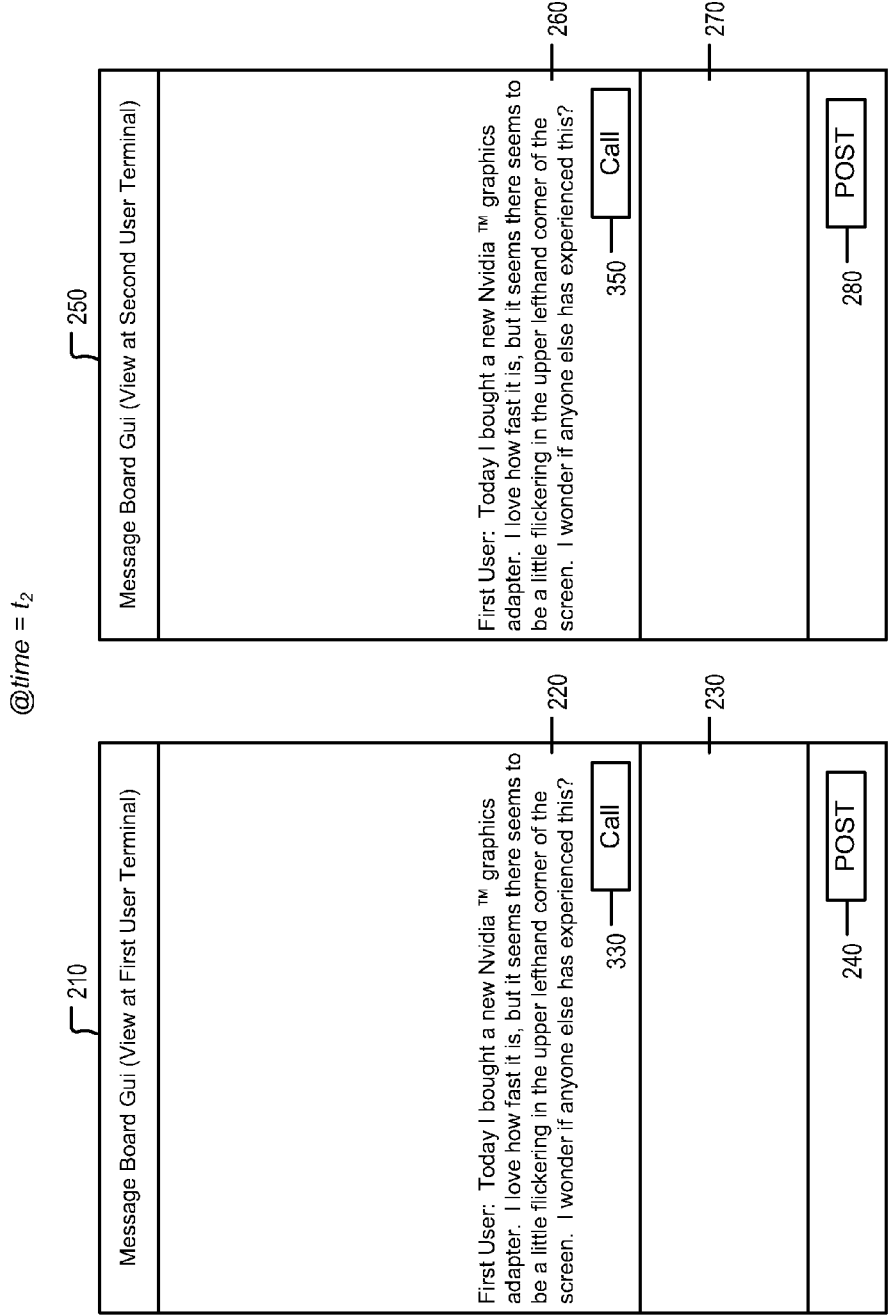
FIG. 3 depicts a schematic diagram of the salient components of the illustrative embodiment of the present invention at time $t_2$.

FIG. 3 depicts a schematic diagram of the salient components of the illustrative embodiment of the present invention at time $t_2$. The illustrative embodiment of the present invention comprises interface 210, field 220, field 230, button 240, interface 250, field 260, field 270, button 280, link 330, and link 350.

At time $t_2$, the message which was entered in field 230 at time $t_1$ is posted on the message board of message board server 120. Field 230 and 260 are updated to reflect the new posting. And links 330 and 350 are presented in interface 210 and 250, respectively.

Link 330 is a graphical user interface (GUI) button component. When link 330 is activated (or pressed), an indication is transmitted from terminal 110-1 to message board server 120. The indication notifies the message board server that terminal 110-1 wishes to initiate a telecommunications session with the telecommunications session recipient for link 330. In accordance with the illustrative embodiment of the present invention, the telecommunications session recipient is the Nvidia™ customer service department. Furthermore, it will be clear to those skilled in the art, after reading this disclosure, how to make and use alternative embodiments of the present invention in which link 330 is another graphical user interface (GUI) (or non-graphical) component (e.g. hyperlink, checkbox, radio button, etc.)

Link 350 is a graphical user interface (GUI) button component. When link 350 is activated (or pressed), an indication is transmitted from terminal 110-3 to message board server 120. The indication notifies the message board server that terminal 110-3 wishes to initiate a telecommunications session with the telecommunications session recipient for link 350. In accordance with the illustrative embodiment of the present invention, the telecommunications session recipient is the user of terminal 110-1. Furthermore, it will be clear to those skilled in the art, after reading this disclosure, how to make and use alternative embodiments of the present invention in which link 350 is another graphical user interface (GUI) (or non-graphical) component (e.g. hyperlink, checkbox, radio button, etc.).

Figure 4:
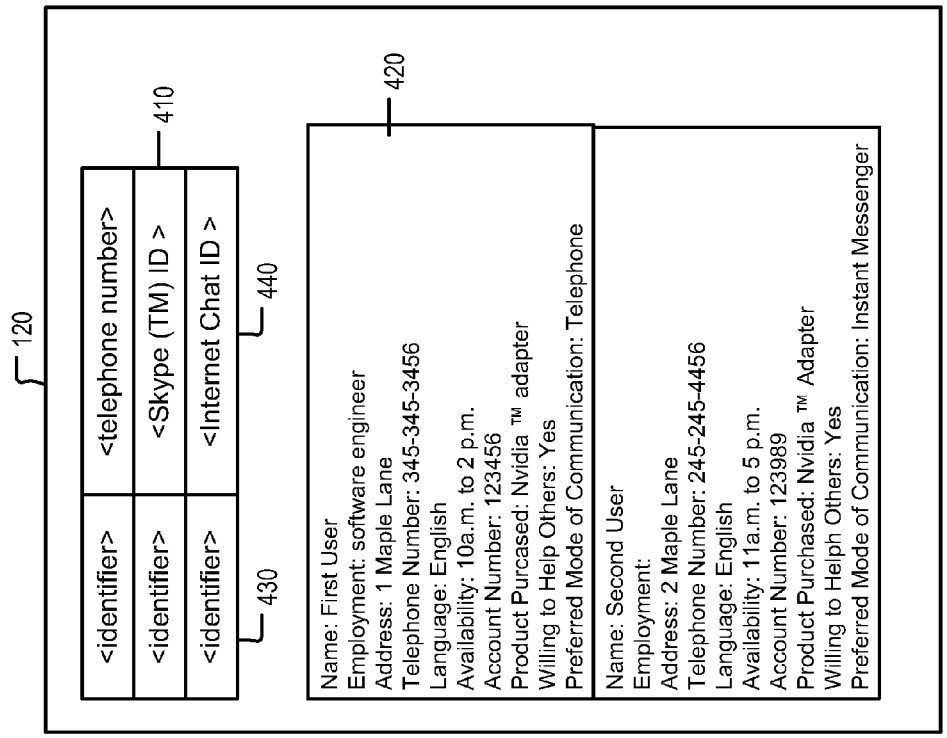
FIG. 4 depicts a schematic diagram of the salient components of the illustrative embodiment of the present invention.

FIG. 4 depicts a schematic diagram of the salient components of the illustrative embodiment of the present invention. The illustrative embodiment of the present invention comprises message board server 120, table 410, column 430, column 440, and table 420.

Table 410 is an information record which relates identifiers with telecommunications network addresses. In accordance with the illustrative embodiment of the present invention, table 410 is database table, but it will be clear to those skilled in the art, after reading this disclosure, how to make and use alternative embodiments of the present invention in which another device is used to store the content of table 410 (e.g. a text file, binary file, etc.). It will be clear to those skilled in the art, after reading this disclosure, how to make and use alternative embodiments of the present invention in which table 410 is stored on computer hardware that is external to message board server 120.

Column 430 contains identifiers. An identifier is a string (e.g. alphanumeric string, number, etc.) which is related with a telecommunications network address. Although, in accordance with the illustrative embodiment of the present invention, there is a one-to-one mapping between identifiers and telecommunications network addresses, it will be clear to those skilled in the art, after reading this disclosure, how to make and use alternative embodiments of the present invention in which the mapping is one-to-many or many-to-one.

Column 440 contains one or more telecommunications network addresses. A telecommunications network address is an endpoint identifier that is unique to the address space of a telecommunications network. In accordance with the illustrative embodiment of the present invention, the telecommunications network addresses are an Internet chat ID, telephone number, and Skype™ ID. However, it will be clear to those skilled in the art, after reading this disclosure, how to make and use alternative embodiments of the present invention in which the telecommunications network addresses belong to other telecommunications networks (e.g. VoIP networks, Internet Protocol networks, cellular networks, etc.).

Table 420 is an information record which stores the profiles of the message board users. A profile is a list of user characteristics. In accordance with the illustrative embodiment of the present invention, the characteristics listed in table 420 are name, employment, address, telephone number, language spoken, account number, identification of a product that has been purchased by the user, indication of whether the user is willing to be selected as a telecommunications recipient, preferred medium of communication, etc. The present invention, however, is in no way limited to these characteristics. It will be clear to those skilled in the art, after reading this disclosure, how to make and use alternative embodiments of the present invention which any item of information about a person is stored in table 420.

In accordance with the illustrative embodiment of the present invention, table 420 is database table, but it will be clear to those skilled in the art, after reading this disclosure, how to make and use alternative embodiments of the present invention in which another device is used to store the content of table 420 (e.g. a text file, binary file, etc.). It will be clear to those skilled in the art, after reading this disclosure, how to make and use alternative embodiments of the present invention in which table 420 is stored on computer hardware that is external to message board server 120.

Figure 5:
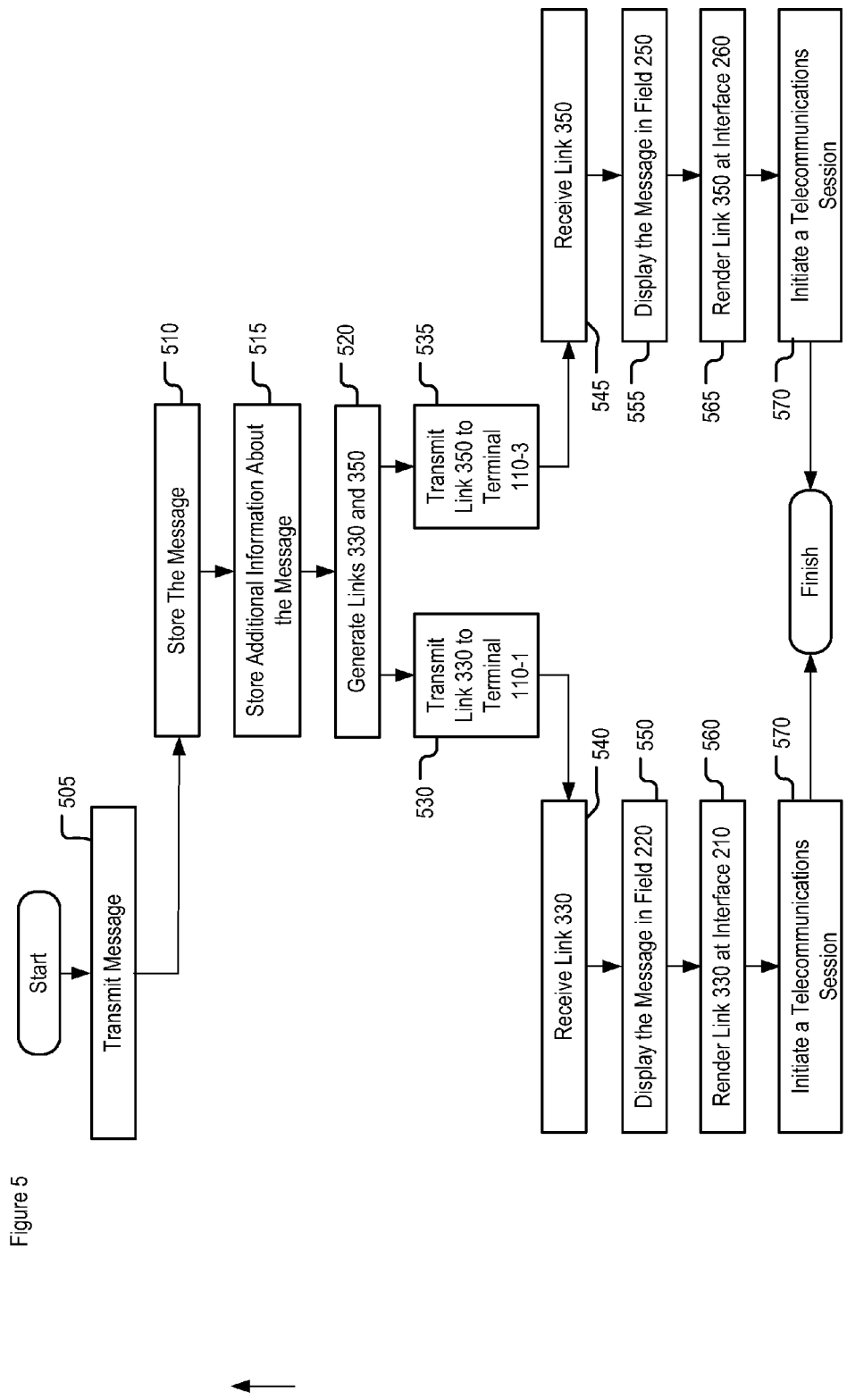
FIG. 5 depicts a flowchart of the execution of the salient subtasks associated with the operation of the illustrative embodiment of the present invention.

FIG. 5 depicts a flowchart of the execution of the salient subtasks associated with the operation of the illustrative embodiment of the present invention. It will be clear to those skilled in the art, after reading this disclosure, how to perform the tasks associated with FIG. 5 in a different order than represented or to perform one or more of the tasks concurrently. Furthermore, it will be clear to those skilled in the art, after reading this disclosure, how to make and use alternative embodiments of the present invention that omit one or more of the tasks.

At task 505, terminal 110-1 transmits the message, which is entered in field 230, to message board server 120.

At task 510, message board server 120 receives the message from terminal 110-1 and stores it in a database. In accordance with the illustrative embodiment of the present invention, the message is a text message, but it will be clear to those skilled in the art, after reading this disclosure, how to make and use alternative embodiments of the present invention in which the message is of another type, such as, for example, and without limitation, picture, sound clip (e.g. a voice message), video file, etc.

At task 515, message board server 120 creates an information record which contains additional information about the message. In accordance with the illustrative embodiment of the present invention, the record contains a message ID, Internet Protocol (IP) address of terminal 110-1, electronic message board ID of the user of terminal 110-1, time and date at which the message is received, etc. It will be clear to those skilled in the art, after reading this disclosure, how to make and use alternative embodiments of the present invention in which additional information concerning the message is stored, such as, for example, and without limitation, message board thread number, topic of the message, etc.

At task 520, message board server 120 generates links 330 and 350. Task 520 is further described in the discussion with respect to FIG. 6.

At task 530, message board server 120 transmits link 330 to terminal 110-1. Task 530 is further described with respect to the discussion of FIG. 7.

Figure 7:
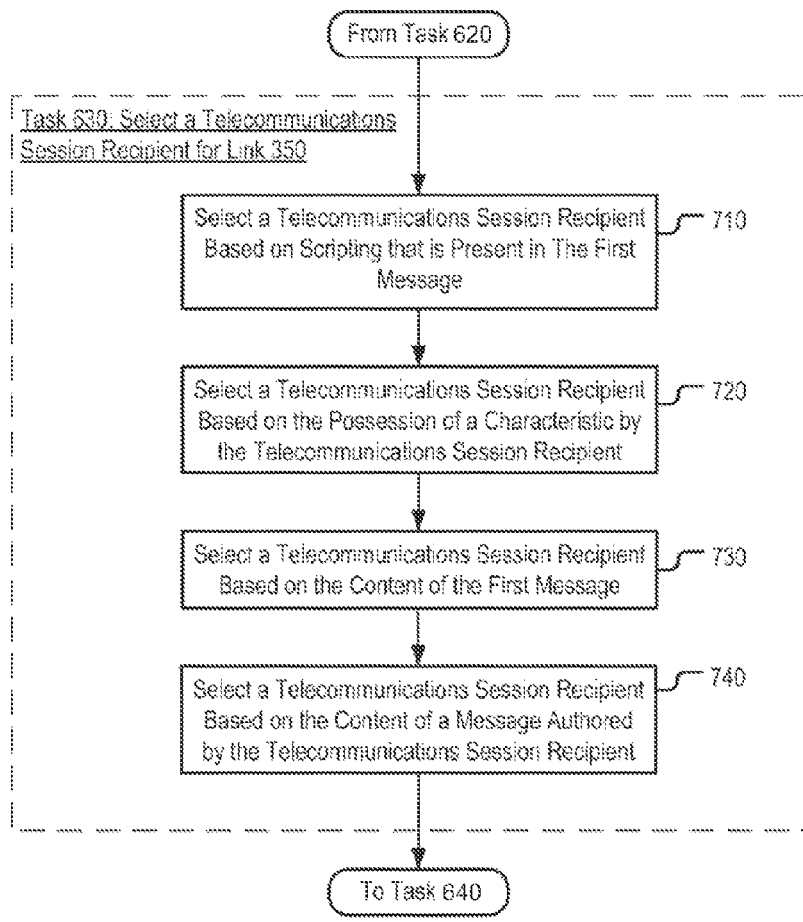
FIG. 7 depicts a flowchart of the execution of the salient sub-tasks associated with the performance of task 630.

At task 535, message board server 120 transmits link 350 to terminal 110-3. Task 535 is further described with respect to the discussion of FIG. 7. Although the discussion with respect to FIG. 7 describes the transmission of link 330, it will be clear to those skilled in the art, after reading this disclosure, how to make and use alternative embodiments of the present invention in which the tasks described in the discussion of FIG. 7 are executed to transmit link 350 instead.

At task 540, terminal 110-1 receives link 330.

At task 550, terminal 110-1 displays, in field 230, the message which was entered in field 220.

At task 550, terminal 110-1 renders link 330. In accordance with the illustrative embodiment of the present invention, terminal 110-1 uses the hypertext markup language (HTML) interpreter of a web browser to render the link, but it will be clear to those skilled in the art, after reading this disclosure, how to make and use alternative embodiments of the present invention in which different software is used (e.g. Java plug-in, Flash plug-n, etc.).

At task 545, terminal 110-3 receives link 350.

At task 555, terminal 110-3 displays, in field 260, the message received at task 510.

At task 565, terminal 110-3 renders link 350. In accordance with the illustrative embodiment of the present invention, terminal 110-3 uses the hypertext markup language (HTML) interpreter of a web browser to render the link, but it will be clear to those skilled in the art, after reading this disclosure, how to make and use alternative embodiments of the present invention in which different software is used (e.g. Java plug-in, Flash plug-n, etc.).

At task 570, message board server 120 initiates a telecommunications session between terminal 110-1 and terminal 110-3. Task 570 is further described in the discussion with respect to FIG. 9. The telecommunications session is initiated after the receipt of an indication by message board server 120 that the user of terminal 110-3 is willing to initiate a telecommunications session with the telecommunications session recipient of link 350. In accordance with the illustrative embodiment of the present invention, the indication is received in the form of an identifier which is transmitted by terminal 110-3 in response to the activation of link 350 (e.g. the pressing of a graphical user interface (GUI) button component). However, it will be clear to those skilled in the art, after reading this disclosure, how to make and use alternative embodiments of the present invention in which alternative means are used to indicate that the user of terminal 110-1 is willing to initiate a telecommunications session with the telecommunications session recipient for link 350, such as, for example and without limitation, the making of remote procedure calls, and others.

Figure 6:
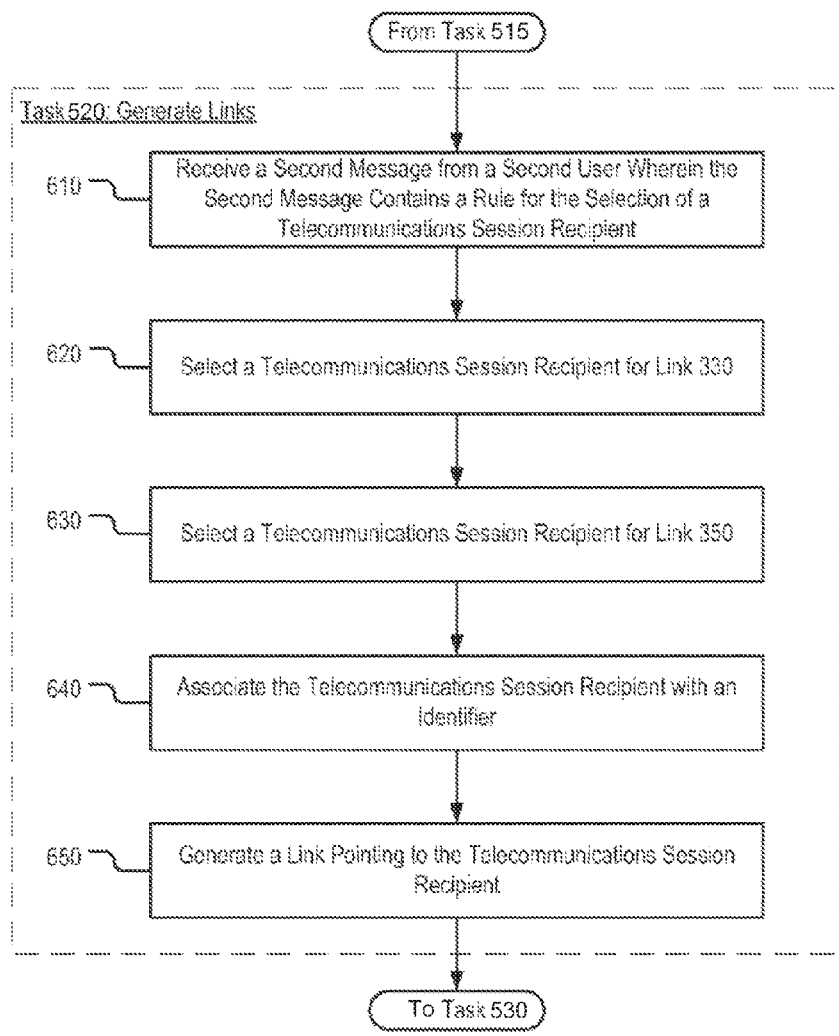
FIG. 6 depicts a flowchart of the execution of the salient sub-tasks associated with the performance of task 520.

FIG. 6 depicts a flowchart of the execution of the salient sub-tasks associated with the performance of task 520. It will be clear to those skilled in the art, after reading this disclosure, how to perform the tasks associated with FIG. 6 in a different order than represented or to perform one or more of the tasks concurrently. Furthermore, it will be clear to those skilled in the art, after reading this disclosure, how to make and use alternative embodiments of the present invention that omit one or more of the tasks.

At task 610, message board server 120 receives a message from terminal 110-2 which contains a rule for the selection of a telecommunications session recipient. The rule specifies a search key and an identification of a telecommunications session recipient. In accordance with the illustrative embodiment of the present invention, the identification of the telecommunications session recipient is the recipient's telephone number. However, it will be clear to those skilled in the art, after reading this disclosure, how to make and use alternative embodiments of the present invention in which the telecommunications recipient is identified in a different way, such as, for example, and without limitation, by using a name, social security number, etc.

More specifically, in accordance with the illustrative embodiment of the present invention, the rule received from terminal 110-2 specifies that the telecommunications session recipient is the Nvidia™ customer service department when the phrase "Nvidia graphics adapter" is contained in a message.

At task 620, message board server 120 selects a telecommunications session recipient for link 330. Message board server 120 searches the message received at task 510 for a string that matches the key specified by the rule received at task 610. If a match is found, message board server 120 selects the telecommunications session recipient specified in the rule.

At task 630, message board server 120 selects a telecommunications session recipient for link 350. In accordance with the illustrative embodiment of the present invention, the selection is made in accordance with one or more rules. The application of these rules is further described in the discussion with respect to FIG. 7.

At task 640, message board server 120 associates the telecommunications session recipient for link 330 with an identifier. Additionally, message board server 120 associates the telecommunications session recipient for link 350 with an identifier. The association of the telecommunications session recipient for link 350 is performed in the same manner as the association of the telecommunications session recipient for link 330.

Message board server 120 associates link 330 with an identifier by randomly generating the identifier, creating a new table row that relates the identifier with a telecommunications session address of the telecommunications session recipient selected at task 620, and adding the new table row to table 410. In accordance with the illustrative embodiment of the present invention, the identifier is randomly generated. However, it will be clear to those skilled in the art, after reading this disclosure, how to make and use alternative embodiments of the present invention in which an ID for the user of terminal 110-1, Internet Protocol (IP) address of terminal 110-1, or any other item of information that is found in table 420, is used instead of a randomly generated identifier.

In accordance with the illustrative embodiment of the present invention, the telecommunications network address, which is related to the identifier, is specified in the rule according to which the recipient is selected. However, in alternative embodiments of the present invention in which the telecommunications network address is not contained in the rule for selection, message board server 120 undertakes additional tasks in order to obtain the telecommunications network address, such as, for example, and without limitation, performing a yellow pages search, searching a telephone directory, etc.

At task 650 message board server 120 generates link 330. Additionally, message board server 120 generates link 350. Link 350 is generated in the same manner as link 330.

Link 330 is generated by creating a hypertext markup language (HTML) tag which describes a button, which, when pressed, causes the hypertext markup language (HTML) client to transmit the identifier back to message board server 120. In accordance with the illustrative embodiment of the present invention, the button tag has the form:

```
<input type="button" value="Call"
    onClick="identifier=123455">.
```

In accordance with the illustrative embodiment of the present invention, link 330 is a button. However, it will be clear to those skilled in the art, after reading this disclosure how to make and use alternative embodiments of the present invention in which link 330 is any type of graphical user interface (GUI) component that is able, when activated, to trigger the transmission of an indication to message board server 120 that the user of terminal 110-1 is willing to initiate a telecommunications session with the telecommunications session recipient for link 330. Examples of such graphical user interface (GUI) components include check boxes, radio buttons, hyperlinks, and others. Furthermore, it will be clear to those skilled in the art, after reading this disclosure, how to make and use alternative embodiments of the present invention in which any scripting or programming language is used to describe link 330, such as, for example, and without limitation, Java Script, JAVA, etc. And still furthermore, it will be clear to those skilled in the art, after reading this disclosure, how to make and use alternative embodiments of the present invention in which message board server 120 generates a binary object (e.g. object file, executable file) instead of a text tag.

In accordance with the illustrative embodiment of the present invention, the activation (i.e. the pressing of the button) of link 330 causes an identifier to be transmitted by terminal 110-2 to message board server 120. However, it will be clear to those skilled in the art, after reading this disclosure, how to make and use alternative embodiments of the present invention in which alternative means are used to indicate that the user of terminal 110-1 is willing to initiate a telecommunications session with the telecommunications session recipient for link 330. In one alternative embodiments of the present invention, the activation of link 330 results in a remote procedure call being made, wherein the call results in the setting up of a telecommunications session by message board server 120.

In another illustrative embodiment of the present invention, terminal 110-1 changes the value of changing the value of a flag variable when link 330 is activated. Message board server 120 periodically checks the value of the variable and when the server detects that the value has been changed, it sets up a telecommunications session between terminal 110-1 and the telecommunications session recipient for link 330.

In a third illustrative embodiment of the present invention, terminal 110-1 sends an empty datagram to message board server 120 when link 330 is activated. The server extracts the source Internet Protocol (IP) address from the datagram and uses it to obtain the telecommunications network address of the telecommunications session recipient.

Stated succinctly, the present invention is not limited to any specific method in which user interface components (graphical and non-graphical) are used to alert message board server 120 to set up a telecommunications session between terminal 110-1 and the telecommunications session recipient for link 330. Furthermore, the present invention is not limited to any specific method in which link 330 is matched to the telecommunications network address of its telecommunications session recipient by message board server 120.

FIG. 7 depicts a flowchart of the execution of the salient sub-tasks associated with the performance of task 630. It will be clear to those skilled in the art, after reading this disclosure, how to perform the tasks associated with FIG. 7 in a different order than represented or to perform one or more of the tasks concurrently. Furthermore, it will be clear to those skilled in the art, after reading this disclosure, how to make and use alternative embodiments of the present invention that omit one or more of the tasks.

In accordance with the illustrative embodiment of the present invention, the telecommunications session recipient for link 350 is selected by executing task 710 only. However, it will be clear to those skilled in the art, after reading this disclosure, how to make and use alternative embodiments of the present invention in which the telecommunications session recipient is selected by executing one or more of tasks 720, 730, and 740.

At task 710, message board server 120 selects a telecommunications session recipient in accordance with a rule that is based on a tag that is present in the message received at task 510. Message board server 120 searches the message symbols and keywords that have a defined meaning. The link-to-author tag at the end of the message is one such symbol. In accordance with the illustrative embodiment of the present invention, the rule for selection of a telecommunications recipient provides that whenever the link-to-author tag is present in a message, the author of the message is to be selected as a telecommunications session recipient for all other message board users who view the message.

In accordance with the illustrative embodiment of the present invention, the tag specifies the identity of the telecommunications session recipient which message board server 120 is required to select. However, it will be clear to those skilled in the art, after reading this disclosure, how to make and use alternative embodiments of the present invention in which specify a criterion which the telecommunications session recipient must meet, such as, for example, and without limitation, a possession of a specific characteristic (e.g. speak English), use of a specific keyword made in prior posts by the telecommunications session recipient, and so forth. It will also be clear to those skilled in the art, after reading this disclosure, how to make and use alternative embodiments of the present invention in which special characters are used instead of scripting tags.

At task 720, message board server 120 selects a telecommunications session recipient in accordance with a rule which depends on the possession of a characteristic by the selected recipient. Message board server 120 searches the user profiles stored in table 420 and selects a user who possesses the preferred characteristic. In accordance with the illustrative embodiment of the present invention, the rule requires that telecommunications session recipient speaks English. However, it will be clear to those skilled in the art, after reading this disclosure, how to make and use alternative embodiments of the present invention in which the preferred characteristic is any characteristic that is identified in table 420.

At task 730, message board server 120 selects a telecommunications session recipient in accordance with a rule which depends on the content of the first message. In accordance with the illustrative embodiment of the present invention, message board server 120 searches for the word "Nvidia" in the message. If the word is found, message board server 120 selects the Nvidia™ customer service department as a telecommunications session recipient. Although, in accordance with the illustrative embodiment of the present invention, the selection of a telecommunications session recipient depends on the presence of a keyword, it will be clear to those skilled in the art, after reading this disclosure, how to make and use alternative embodiments of the present invention in which the selection of a telecommunications session recipient depends on the topic of the message. In the alternative embodiments of the present invention, the topic is determined by performing topic analysis on the message. It will be clear to those skilled in the art how to perform topic analysis.

At task 740, message board server 120 selects a telecommunications session recipient in accordance with a rule which depends on the content of a message posted by the recipient. In accordance with the illustrative embodiment of the present invention, message board server 120 searches for the word "Nvidia" in the messages posted by another user of the message board. If the word is found, message board server 120 selects the user as a telecommunications session recipient. Although, in accordance with the illustrative embodiment of the present invention, the selection of a telecommunications session recipient depends on the presence of a keyword, it will be clear to those skilled in the art, after reading this disclosure, how to make and use alternative embodiments of the present invention in which the selection of a telecommunications session recipient depends on the topic of the message (e.g. select person A if he made posts on the topic of poetry, etc.). In the alternative embodiments of the present invention, the topic is determined by performing topic analysis on the message. It will be clear to those skilled in the art how to perform topic analysis.

Figure 8A:
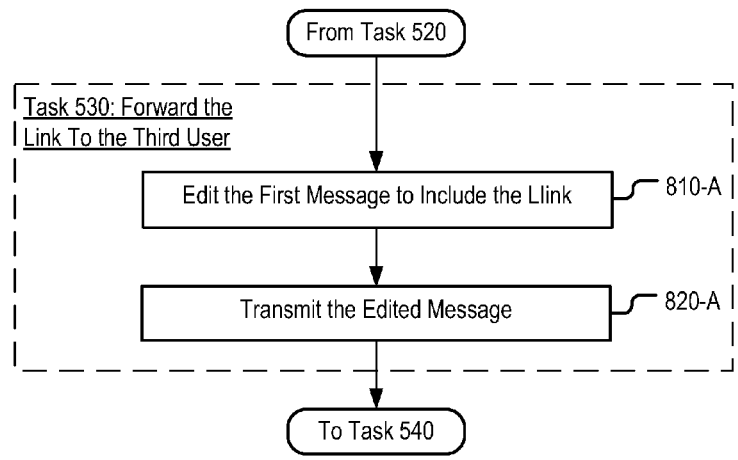
FIG. 8A depicts a flowchart of the execution of the salient sub-tasks associated with the execution of task 530 as performed by a first illustrative embodiment of the present invention.

FIG. 8A depicts a flowchart of the execution of the salient sub-tasks associated with the execution of task 530 as performed by a first illustrative embodiment of the present invention.

At task 810-A, message board server 120 edits the message received at task 510 to include the link that is generated at task 650. In particular, message board server 120 appends the link to the message.

At task 820-A, message board server 120 transmits the edited message to a recipient terminal.

Figure 8B:
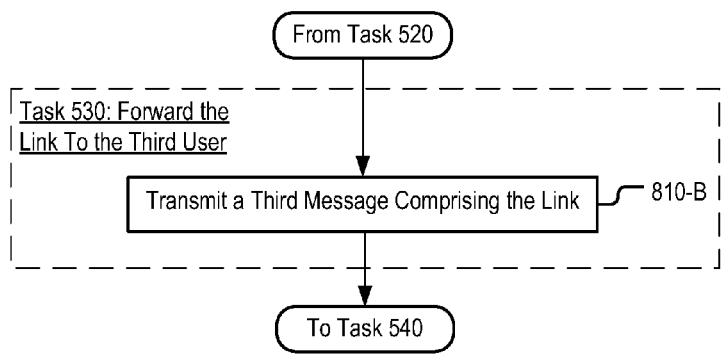
FIG. 8B depicts a flowchart of the execution of the salient sub-tasks associated with execution of task 530 as performed by a second illustrative embodiment of the present invention.

FIG. 8B depicts a flowchart of the execution of the salient sub-tasks associated with execution of task 530 as performed by a second illustrative embodiment of the present invention.

Figure 9:
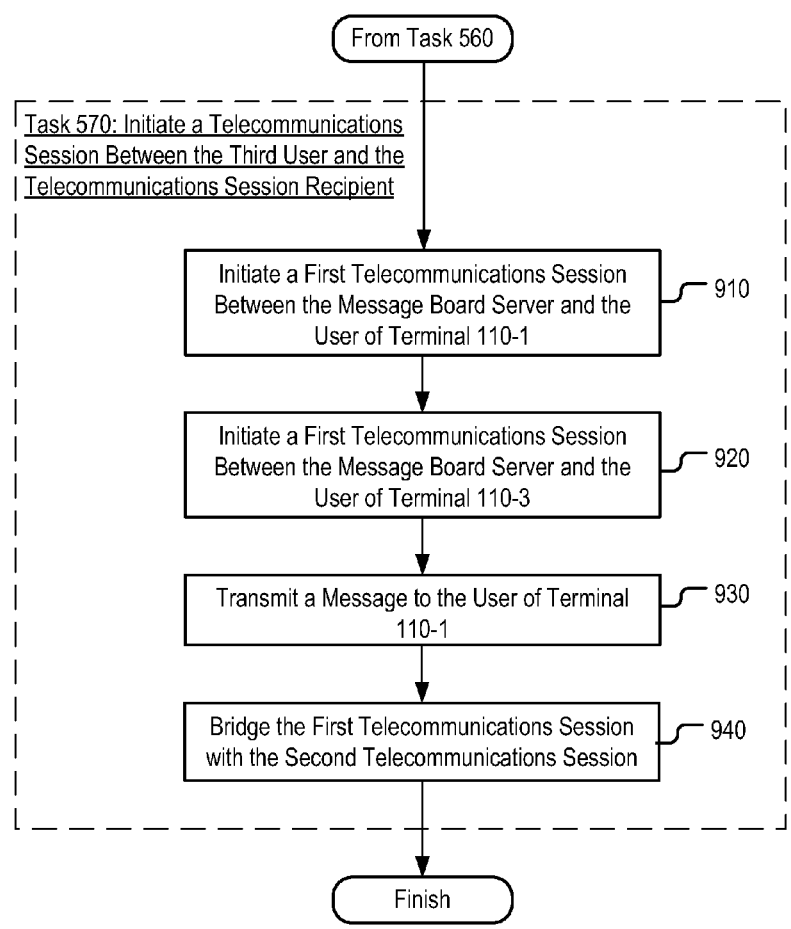
FIG. 9 depicts a flowchart of the execution of the salient sub-tasks associated with the performance of task 570.

At task 810-B, message board server 120 transmits the link that is generated at task 650 to a recipient terminal FIG. 9 depicts a flowchart of the execution of the salient sub-tasks associated with the performance of task 570. It will be clear to those skilled in the art, after reading this disclosure, how to perform the tasks associated with FIG. 9 in a different order than represented or to perform one or more of the tasks concurrently. Furthermore, it will be clear to those skilled in the art, after reading this disclosure, how to make and use alternative embodiments of the present invention that omit one or more of the tasks.

At task 910, message board server 120 initiates a telecommunications session between terminal 110-3 and message board server 120. In accordance with the illustrative embodiment of the present invention, message board server 120 initiates a telephone call, but it will be clear to those skilled in the art, after reading this disclosure, how to make and use alternative embodiments of the present invention in which message board server 120 initiates another type of telecommunications session, such as, for example, and without limitation, an instant message exchange, a short message service (SMS) message exchange, etc.

At task 920, message board server 120 initiates a telecommunications session between terminal 110-1 and message board server 120. In accordance with the illustrative embodiment of the present invention, message board server 120 initiates a telephone call, but it will be clear to those skilled in the art, after reading this disclosure, how to make and use alternative embodiments of the present invention in which message board server 120 initiates another type of telecommunications session, such as, for example, and without limitation, an instant message exchange, a short message service (SMS) message exchange, etc.

At task 930, message board server 120 transmits a message to terminal 110-1 indicating that the telephone call is in relation to the message posted by the user of terminal 110-1. In accordance with the illustrative embodiment of the present invention, the message comprise the phrase "this message is in relation to message <message number> posted on message board <board name>," where <message number> is an ID for the message, and <board name> is a name for the board on which the message was posted. In accordance with the illustrative embodiment of the present invention, message board server 120 uses text-to-speech technology to reproduce the message as speech. It will be clear to those skilled in the art, after reading this disclosure, how to make and use alternative embodiments of the present invention in which any item of information concerning the message received at task 510 is made part of the message transmitted at task 840, such as, for example, and without limitation, time at which the message was received, identifier of the submitter of the message, Internet Protocol (IP) address of the submitter, topic of the message, the presence of one or more keywords in the message, etc.

It will be clear to those skilled in the art, after reading this disclosure, how to make and use alternative embodiments of the present invention in which in which message board server 120 implements interactive voice response functionality (IVR) which allows users to reschedule the call to a more convenient time. In these embodiments, when a user reschedules, message board server terminates the telecommunications sessions started at tasks 910 and 920. Subsequently, message board server executes tasks 910 through 920 at the rescheduled time.

Furthermore, it will be clear to those skilled in the art, after reading this disclosure, how to make and use alternative embodiments of the present invention in which message board server 120 provides the user of terminal 110-1 with the opportunity to route the call to a different telecommunications system, such as a video bridge. When this is the case, message board server 120 terminates the second telecommunications session and initiates a telecommunications session between message board server 120 and a telecommunications system which is specified by the user during the second telecommunications session.

At task 940, message board server 120 bridges the call started at task 910 with the call started at task 920. It will be clear to those skilled in the art how to execute task 940.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving a message on an electronic message board;
   identifying a rule for selecting a communications recipient associated with the message, wherein the rule is based on a content of the message;
   selecting the communications recipient based on the message and the rule;
   generating, via a processor, a hyperlink pointing to an endpoint identifier associated with the communications recipient, wherein the endpoint identifier was not included in the message when the message was received;
   transmitting the message and the hyperlink to a device associated with a user requesting access to the message, wherein the hyperlink is configured to be presented with the message at the device to the user; and
   when the hyperlink is activated:
      initiating a real time communication session between the user and the communications recipient; and
      transmitting a second message to the communications recipient comprising information about the message.

2. The method of claim 1, wherein initiating the communication session comprises bridging a first communication session and a second communication session, the first communication session being between a central device and the user, and the second communication session being between the central device and the communications recipient.

3. The method of claim 2, further comprising, prior to bridging the first communication session and the second communication session, transmitting a second message to the endpoint identifier, wherein the second message comprises information about one of the message, the communication session, or the user.

4. The method of claim 3, wherein the second message provides the communications recipient an opportunity to perform one of accepting the communication session or declining the communication session.

5. The method of claim 1, wherein the communications recipient is selected further based on a characteristic of the communications recipient.

6. The method of claim 1, wherein the communications recipient is selected further based on the content of the message.

7. The method of claim 1, wherein the rule is based on a tag in the message, the tag having been inserted into the message by a sender of the message.

8. The method of claim 1, wherein the communications recipient is selected further based on a characteristic of a sender of the message.

9. The method of claim 1, wherein the hyperlink is based on the content of the message.

10. The method of claim 1, further comprising editing the message to include an availability indicator for the communications recipient.

11. A system comprising:
    a processor; and
    a computer-readable storage medium storing instructions which, when executed by the processor, cause the processor to perform operations comprising:
       receiving a message on an electronic message board;

identifying a rule for selecting a communications recipient associated with the message, wherein the rule is based on a content of the message;

selecting the communications recipient based on the message and the rule;

generating a hyperlink pointing to an endpoint identifier associated with the communications recipient, wherein the endpoint identifier was not included in the message when the message was received;

transmitting the message and the hyperlink to a device associated with a user requesting access to the message, wherein the hyperlink is configured to be presented with the message at the device to the user; and when the hyperlink is activated:
  initiating a real time communication session between the user and the communications recipient; and
  transmitting a second message to the communications recipient comprising information about the message.

12. The system of claim 11, wherein initiating the communication session comprises bridging a first communication session and a second communication session, the first communication session being between a central device and the user, and the second communication session being between the central device and the communications recipient.

13. The system of claim 11, wherein the communications recipient is selected further based on a characteristic of the communications recipient.

14. The system of claim 11, wherein the communications recipient is selected further based on the content of the message.

15. A computer-readable storage device storing instructions which, when executed by a processor, cause the processor to perform operations comprising:

receiving a message on an electronic message board;

identifying a rule for selecting a communications recipient for the message, wherein the rule is based on a content of the message;

selecting the communications recipient based on the message and the rule;

generating a hyperlink pointing to an endpoint identifier associated with the communications recipient, wherein the endpoint identifier was not included in the message when the message was received;

transmitting the message and the hyperlink to a device associated with a user requesting access to the message, wherein the hyperlink is configured to be presented with the message at the device to the user; and when the hyperlink is activated:
  initiating a real time communication session between the user and the communications recipient; and
  transmitting a second message to the communications recipient comprising information about the message.

16. The computer-readable storage device of claim 15, wherein initiating the communication session comprises bridging a first communication session and a second communication session, the first communication session being between a central device and the user, and the second communication session being between the central device and the communications recipient.

17. The computer-readable storage device of claim 15, wherein the communications recipient is selected further based on a characteristic of the communications recipient.

* * * * *